Oct. 25, 1949.  E. S. KAVANAUGH  2,486,170
EXTENSIBLE CANOPY
Filed Feb. 19, 1947  2 Sheets-Sheet 1
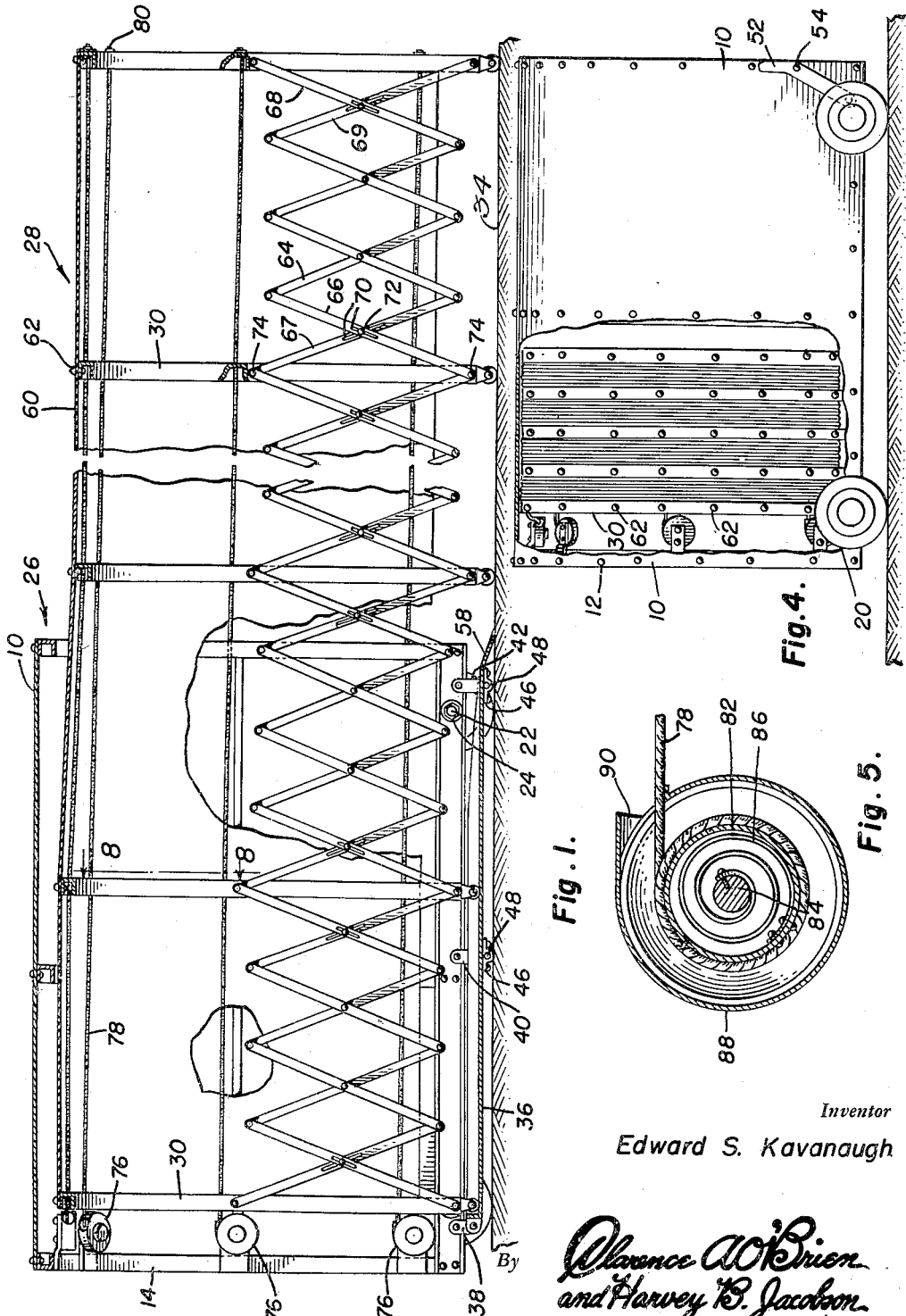
Inventor
Edward S. Kavanaugh

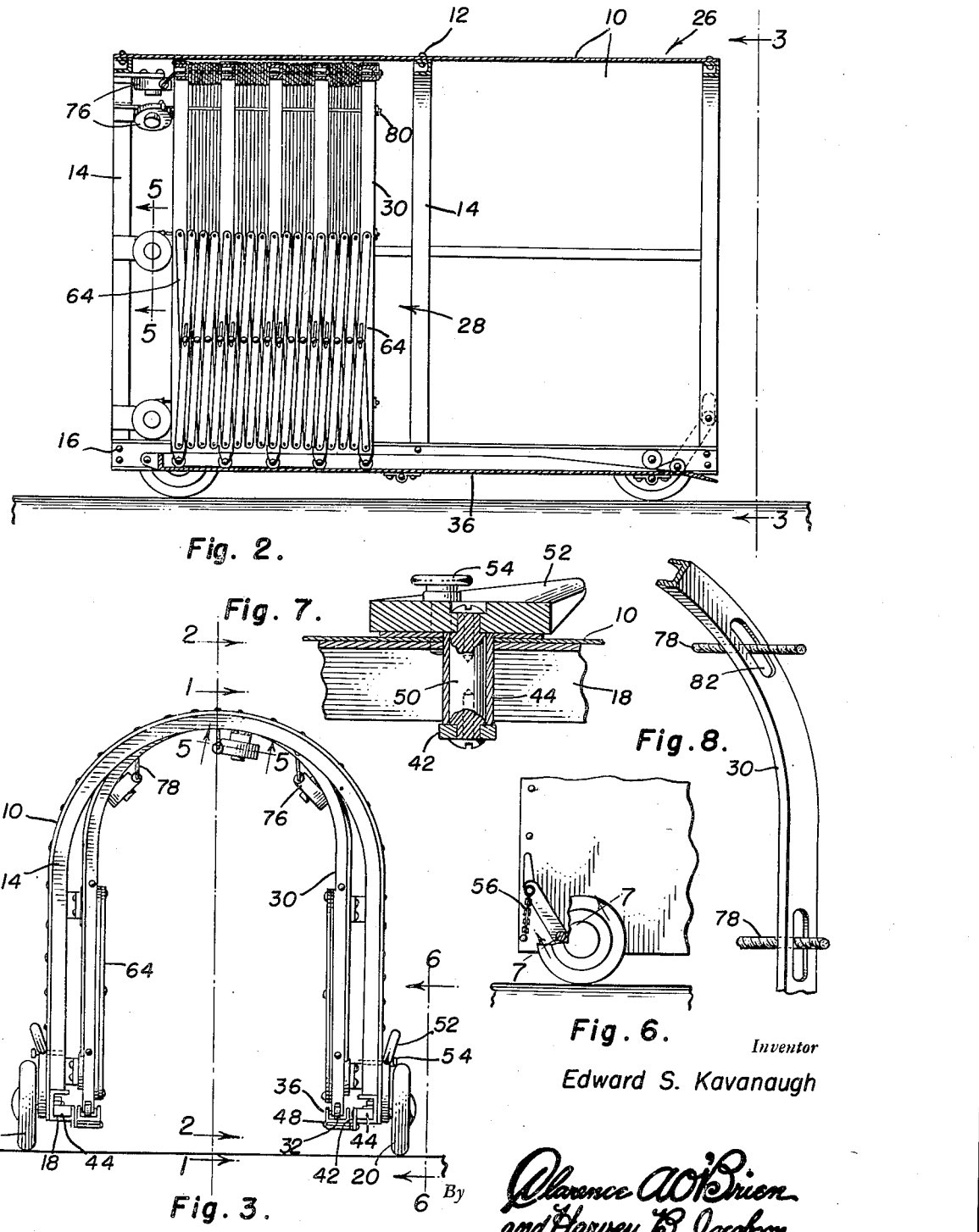

Patented Oct. 25, 1949

2,486,170

UNITED STATES PATENT OFFICE 2,486,170

EXTENSIBLE CANOPY

Edward S. Kavanaugh, Notre Dame, Ind., assignor of one-half to Eugene M. Quinn, Oak Park, Ill.

Application February 19, 1947, Serial No. 729,623

6 Claims. (Cl. 135—5)

This invention relates generally to canopies, and more particularly to a canopy assembly including a movable housing and a flexible canopy adapted to be collapsed or retracted within said housing or partially or wholly extended from said housing, the device being adapted to furnish enclosure for use at hotel entrances, church entrances and outdoor exhibits and the like, but being primarily designed for use at an airport and when extended to provide an enclosure reaching from the airplane cabin or cargo loading ramp to the terminal building.

It is well understood that movable canopies have been developed and used, prior to this invention, and a patent for a mobile canopy is not sought, but what is sought to be protected by Letters Patent is the specially designed means whereby this movable canopy is adapted for a specialized use, as will be hereinafter described in detail.

It is a primary object of this invention to provide means whereby an enclosure extending from an airplane to a terminal building may be quickly and easily supplied, after said airplane has landed, this enclosure providing for the loading and unloading of passengers and cargo in relative comfort during inclement weather.

Another object of this invention is to provide means of this character which can be readily rolled out of the way when not in use, the canopy being retractible into comparatively small space, the canopy assembly including a housing for the retracted canopy.

Another object of this invention is to provide said housing with means adapted to act as a brake or ground contacting member, whereby said housing may be rendered temporarily immobile and obviating the necessity of elaborate securing means for said housing, and this braking mechanism is adapted to coact with frame members incorporated with the extensible portion of the canopy in a novel and very convenient manner, facilitating the extension and retraction of the canopy.

Another object of this invention is to incorporate with a device of this character, cables adapted to be extended longitudinally of the canopy and to support the sheet material or covering of the canopy, between the rigid frame members to which this covering is secured.

And a last object to be specifically mentioned is to provide a canopy assembly for the particular purpose described, which is relatively inexpensive and practicable to manufacture, simple and convenient to use, and which will give generally efficient and durable service.

With these and other objects definitely in view, this invention resides in certain novel features of construction, combination and arrangement of parts and portions as will be hereinafter described in detail and particularly set forth in the appended claims, reference being had to the accompanying drawings which form a material part of this application and in which:

Figure 1 is a vertical longitudinal sectional view, taken on the center line 1—1 in Figure 3, the channel members used as a combination brake and support for the U-shaped frame members being shown in depressed or ground contacting position, instead of the retracted position of these members indicated in Figure 3;

Figure 2 is a similar longitudinal vertical sectional view, taken on the line 2—2 in Figure 3, and showing the extensible canopy retracted within the housing;

Figure 3 is an end view of the device taken along line 3—3 of Figure 2.

Figure 4 is a side elevational view of the housing, portions of the structure in the foreground, including the sheet metal covering and the lazy tongs, being broken away to show the underlying structure in elevation and in section;

Figure 5 is a vertical sectional view taken on the line 5—5 in Figure 2, to show the internal structure of one of the reels used to retract cables stretched between the U-shaped frame members of the extensible portion of the canopy;

Figure 6 is a side elevational view, fragmentary in character, taken from the line 6—6 in Figure 3, and adapted to illustrate structure used to retain the frame supporting members in elevated position;

Figure 7 is a fragmentary detail view, of a portion of the structure shown in Figure 6, the view being taken on the line 7—7 in Figure 6; and Figure 8 is a fragmentary detail enlarged view of one of said frame members and contiguous portions of the said cables.

Similar characters of reference designate similar or identical parts and portions throughout the specification and throughout the several views of the drawing.

It will be understood that the drawings represent only one preferred embodiment of this invention in which the housing for the extensible portion of the canopy is constructed of sheet metal 10 secured by rivets 12 to spaced channel members 14 which are of inverted U-shape, with the depending arm portions thereof disposed vertically, and the lower ends of these depending arm portions are rigidly secured as by rivets 16, to horizontally disposed channel members 18, or the flange portions of the depending arms may be cut back and the channel members 18 secured by welding. In order to make the housing readily portable, wheels 20 are mounted on stub axles 22, secured to the vertical portions of the horizontally disposed channel member 18 as by the nuts 24. It has been found that four of these wheels 20 are required. For purposes of reference in the following description, the canopy housing described above will be referred to simply as the housing 26, and the extensible portion of the canopy assembly will be referred to as the extensible portion 28. This extensible portion 28 includes a plurality of U-shaped channel members 30, the depending portions of these members corresponding substantially in length with the depending portions of the U-shaped channel members 14 of the housing 26, but the arcuate portions of the members 30 being bent on a smaller radius, so that the depending portions of the members 30 are spaced within the depending portions of the members 14, as best illustrated in Figure 3. Casters 32 are operatively secured to the lower ends of each of the members 30, and these casters are adapted to contact the ground, represented at 34, when the extensible portion 28 is in a position represented in Figure 1, and to be supported on a pair of channel members 36 when the extensible portion 28 is in retracted position, as represented in Figure 2. These channel members 36 are pivotally mounted to the horizontally disposed channel members 18 by the link members 38 at the forward end of the housing 26, the link member 40 at the midpoint of the housing 26 and the link member 42 at the other end of the housing, spacer sleeve members 44 being provided in each case, and in the case of the links 40 and 42 bearing members 46 are used to mount the pivot pins 48 on the lower faces of the channel members 36. In order to make the channel members 36 depressible the link 42 is secured on a squared end of a pivot pin 50, which is rotatably mounted in the sleeve 44, as indicated above, the other end of the pin 50 being similarly squared and secured to the lower end of a lever 52, it being understood that two of these levers 52 are provided to raise and lower the two channel members 36. Obviously other means may be provided to operatively connect these levers with the channel members 36, the essential features of this construction being the disposition of the levers exteriorly of the housing 26 and the arrangement of the various elements concerned so that the channels 36 may be allowed to depress into contact with the ground, in order that these channel members may function as a brake or securing means for the housing 26 when the extensible portion 28 is extended and the device is in use. Any simple lever locking device, such as the pins 54 shown in the drawings as insertable through apertures provided therefor in the upper portions of the levers and in the lower portions of the adjacent member 14 of the housing, a chain 56 being provided to prevent the loss of the pin 54. A pair of ramps 58 are provided on the ends of the channel members 36, being pivotally secured thereto and adapted to contact the ground and provide an inclined plane whereupon the casters 32 may roll upwardly onto the channel members 36 when the extensible portion 28 is being retracted to the housing 26.

The extensible portion 28 is provided with a flexible covering 60, which will ordinarily be of canvas cloth, but may very suitably be constructed of any transparent or opaque fabric or plastic covering that will fold up when the canopy is retracted, as represented in Figure 2. This covering 60 is secured in any suitable manner, as represented at 62 to the channel members 30, and the spacing of these members 30 longitudinally along the said covering 60 is made to suitably correspond with the character of the lazy tongs 64 secured internally to the depending portions of the members 30. This lazy tong system 64 will ordinarily have a similar number of levers in each section thereof secured between adjacent frame members 30, so that the covering 60 will be uniformly stretched throughout the length thereof when the extensible portion 28 is extended, and it is noted that the levers 66, 67, 68 and 69, at either end of a section of the lazy tongs between any adjacent pair of members 30, are slotted as at 10, so that the pivot pin 72 may move longitudinally of these levers 66 to 69, thus making it possible to have the pivot pins 74 rigidly fixed on the members 30 to carry the weight of the lazy tongs.

A plurality of cable reels 76 are secured, in spaced relation, to the inside of the channel member 14 at one end of the housing 26, these reels having cables 78 associated therewith and terminally secured, as at 80 to a member 30 at the outer end of the canopy assembly, that is, the member 30 farthest removed from the above referred to end member 14. These cables are retained in taut relationship by the action of coiled spring members within the reels 76, the cables being threaded through apertures 82 in the members 30, as shown in Figure 8, and serve to support the covering 60 between the members 30 when the canopy is extended or collapsed. Figure 5 represents one method of constructing one of these reels. The cable 78 is represented as coiled upon a drum 82, which is mounted upon an axial member 84 and biased by a spring 86, terminally secured to said axial member and to said drum, the whole being enclosed in a casing 88 having an aperture 90 wherethrough the cable 78 is threaded. The operation of this invention will be understood from a consideration of the foregoing description of the mechanical details thereof, taken in connection with the drawings and the recitation of objects sought to be achieved by this invention, but it may be noted that when the extensible portion 28 is retracted into the housing 26 by collapsing the lazy tong system 64 and the cover 60 between adjacent pairs of journal members 30, the latter being rolled along the ground on the casters 32 and elevated onto the channel members 36 when fully retracted, the lever 52 on either side of the assembly being then used to elevate the members 36 carrying with them the contracted extensible portion 28, and elevation of the members 36 from the ground will now allow the easy movement of the housing. It will be understood, of course, that the cables 78 will be simultaneously wound on the drums 82 of the reels provided therefor.

Though there has been shown a particular embodiment of this invention, this application is not limited to this particular embodiment, but it is desired to include in the scope of this invention the construction, combination and arrangement of parts and portions substantially as set forth in the appended claims.

What is claimed as new and desired to be secured by Letters Patent is:

1. A canopy assembly including a movable housing, a flexible canopy adapted to be retracted within said housing and extended from said housing, said canopy being self-supporting when extended and having rigid transverse frame members and flexible sheet material secured thereto, and retractible cables adapted to be stretched between said frame members and to support portions of said sheet material between said frame members when the canopy is partially or wholly extended and when the canopy is collapsed within said housing.

2. A canopy assembly including a movable housing, a flexible canopy adapted to be retracted within said housing and extended from said housing, said canopy being self-supporting when extended and having rigid transversely disposed frame members, the lower ends of said frame members having ground contacting casters, said frame members being substantially inverted U-shaped and the depending arms of adjacent frame members on each side of the canopy being connected by lazy tongs.

3. A canopy assembly including a movable housing, a flexible canopy adapted to be retracted within said housing and extended from said housing, said canopy being self-supporting when extended and having rigid transversely disposed frame members, reels mounted on the housing and having spring biased drums, cables terminally secured to said drums and to the outermost of said frame members, guide means for said cables on the other frame members, whereby the portions of the extended canopy between the frame members is supported, the lower ends of said frame members having ground contacting casters, said housing having horizontally disposed members of a length less than the extended canopy and whereon said casters may be rolled when the canopy is retracted, said horizontally disposed members having ramps on the ends thereof remote from said housing.

4. A canopy assembly including a movable housing, a flexible canopy adapted to be retracted within said housing and extended from said housing, said canopy being self-supporting when extended and having rigid transversely disposed frame members, the lower ends of said frame members having ground contacting casters, said housing having horizontally disposed members whereon said casters may be rolled when the canopy is retracted, said horizontally disposed members being adjustably mounted on said housing to allow depression thereof into contact with ground, whereby said housing is rendered temporarily immobile.

5. An assembly according to claim 4 and wherein said horizontally disposed members are supported on link members pivoted on said housing, and levers on certain of said links, whereby the last mentioned links may be moved to depress and to raise said horizontally disposed members.

6. A canopy assembly including a movable housing, a flexible canopy adapted to be retracted within said housing and extended from said housing, said canopy being self-supporting when extended and having rigid transversely disposed frame members, reels mounted on the housing and having spring biased drums, cables terminally secured to said drums and to the outermost of said frame members, guide means for said cables on the other frame members, whereby the portions of the extended canopy between the frame members is supported.

EDWARD S. KAVANAUGH.

REFERENCES CITED

The following references are of record in the file of this patent:

UNITED STATES PATENTS

| Number | Name | Date |
| --- | --- | --- |
| 694,172 | Moore | Feb. 25, 1902 |
| 1,713,923 | Schlicher | May 21, 1929 |
| 1,834,796 | Mourceau | Dec. 1, 1931 |